United States Patent
Aragai et al.

(10) Patent No.: US 10,953,795 B2
(45) Date of Patent: Mar. 23, 2021

(54) VEHICLE CONTROL DEVICE AND VEHICLE CONTROL METHOD

(71) Applicants: Takashi Aragai, Aichi (JP); Hirohito Miyazaki, Gifu (JP)

(72) Inventors: Takashi Aragai, Aichi (JP); Hirohito Miyazaki, Gifu (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 0 days.

(21) Appl. No.: 16/816,536

(22) Filed: Mar. 12, 2020

(65) Prior Publication Data
US 2020/0290511 A1 Sep. 17, 2020

(30) Foreign Application Priority Data
Mar. 15, 2019 (JP) .............................. JP2019-048417

(51) Int. Cl.
*B60Q 1/22* (2006.01)
*B60Q 9/00* (2006.01)
*B60W 40/12* (2012.01)
*B60W 40/08* (2012.01)

(52) U.S. Cl.
CPC .............. *B60Q 9/00* (2013.01); *B60W 40/08* (2013.01); *B60W 40/12* (2013.01); *B60W 2040/0881* (2013.01)

(58) Field of Classification Search
CPC ......... B60Q 9/00; B60W 40/12; B60W 40/08; G08B 21/22; G08B 25/016; G08B 7/06; G08B 21/0202; G08B 1/08
See application file for complete search history.

(56) References Cited

U.S. PATENT DOCUMENTS 7,079,016 B2 *  7/2006  Ho .................... G08B 21/22
                                                180/273
10,311,693 B1 *  6/2019  Lee .................... B60Q 9/00

FOREIGN PATENT DOCUMENTS

| JP | 2001-160192 A | 6/2001 |
| JP | 2005-200895 A | 7/2005 |
| JP | 2007-077652 A | 3/2007 |
| JP | 2016-016819 A | 2/2016 |

* cited by examiner

*Primary Examiner* — Toan N Pham
(74) *Attorney, Agent, or Firm* — Osha Bergman Watanabe & Burton LLP

(57) ABSTRACT

A vehicle control device is configured to determine whether or not a living body is left behind in a vehicle. The vehicle control device includes an operation information acquisition unit that acquires first operation information indicating whether a first type of opening/closing unit related to getting-on/off of an occupant is operated and second operation information indicating whether a second type of opening/closing unit other than the first opening/closing unit is operated; a leaving determination unit that determines whether the living body is left behind with reference to the first operation information, and determines execution of a leaving alarm in a case where it is determined that the living body is left behind; and an execution holding unit which holds the execution of the leaving alarm in a case where the second operation information indicates that the second type of opening/closing unit is operated.

5 Claims, 6 Drawing Sheets

VEHICLE CONTROL DEVICE AND VEHICLE CONTROL METHOD

CROSS-REFERENCES TO RELATED APPLICATIONS

This application is based upon and claims the benefit of priority from Japanese Patent Application No. 2019-048417, filed on Mar. 15, 2019; the entire contents of which are incorporated herein by reference.

FIELD

One or more embodiments of the present invention relate to a vehicle control device and a vehicle control method.

BACKGROUND

In the related art, a situation where a guardian goes out of the vehicle while leaving a child in the vehicle interior and forgets that the child is present in the vehicle interior, and the child is left behind in the vehicle interior has become a major problem.

In order to solve this problem, various measures and studies have been carried out. For example, in JP-A-2001-160192, an abnormal situation reporting system automatically detects an abnormal situation in the vehicle interior, and notifies a store or the like where there is a high possibility that a driver who is away from the vehicle is present of the detected abnormal situation. Specifically, the occurrence of an abnormal situation in the vehicle interior is detected using a temperature sensor for detecting that the temperature in the vehicle interior rapidly rises, a human body sensor for determining whether or not a person remains in the vehicle interior, and the like.

Further, in JP-A-2007-77652, in a state where an occupant is present in the vehicle interior, the control device of the vehicle door inputs an opening command of the vehicle door into control means by an operation outside the vehicle, and accordingly, without opening the vehicle door, an alarm for prompting the occupant to open the vehicle door is issued from alarm means.

In JP-A-2005-200895, a vehicle-side transmitter transmits a request signal in accordance with detection by a detection sensor. When the vehicle-side receiver does not receive an answer signal including a normal ID code from the portable transceiver within the predetermined period of time, the control unit stops the transmission operation of the request signal of the vehicle-side transmitter.

Furthermore, in JP-A-2016-16819, in a case where an operation detecting unit detects a predetermined operation, a transmission processing unit transmits a request signal. Then, a target detecting unit detects that the detection target is positioned in the vicinity of the vehicle based on the reception processing unit receiving the response signal returned from the portable device in response to the request signal transmitted by the transmission processing unit in a case where the operation detecting unit detects a predetermined operation.

SUMMARY

However, in the techniques disclosed in JP-A-2001-160192, JP-A-2007-77652, JP-A-2005-200895, JP-A-2016-16819, in a case where the user is out of the vehicle for the purpose such as gasoline supply, car washing, chat with an acquaintance, or the like, and even in a case where it is detected that a person remains in the vehicle interior, the alarm is issued. As a method for preventing an unnecessary alarm described above from being issued in a case where the user is out of the vehicle for the above-described purpose, it is considered to provide a switch or the like for canceling the alarm. However, in this method, there is a high possibility that the user feels the switch operation troublesome, and there is a problem in terms of user convenience.

An object of one or more embodiments of the invention is to realize a vehicle alarm control device capable of suppressing unnecessary alarms without deteriorating user convenience.

In one or more embodiments of the invention, there is provided a vehicle control device for determining whether or not a living body is left behind in a vehicle, the vehicle control device including: an operation information acquisition unit that acquires first operation information indicating whether or not a first type of opening/closing unit is operated and second operation information indicating whether or not a second type of opening/closing unit is operated, the first type of opening/closing unit being an opening/closing unit related to getting-on/off of an occupant and included in opening/closing units of the vehicle, the second type of opening/closing unit being an opening/closing unit other than the first type of opening/closing unit and included in the opening/closing units of the vehicle; a leaving determination unit that determines whether or not the living body is left behind with reference to the first operation information, and determines execution of a leaving alarm in a case where it is determined that the living body is left behind; and an execution holding unit that holds the execution of the leaving alarm by the leaving determination unit in a case where the second operation information indicates that the second type of opening/closing unit is operated.

In one or more embodiments of the invention, there is provided a vehicle control method for determining whether or not a living body is left behind in a vehicle, the vehicle control method including: acquiring first operation information indicating whether or not a first type of opening/closing unit is operated and second operation information indicating whether or not a second type of opening/closing unit is operated, the first type of opening/closing unit being an opening/closing unit related to getting-on/off of an occupant and included in opening/closing units of the vehicle, the second type of opening/closing unit being an opening/closing unit other than the first type of opening/closing unit and included in the opening/closing units of the vehicle; determining whether or not the living body is left behind with reference to the first operation information, and determining execution of a leaving alarm in a case where it is determined that the living body is left behind; and holding the execution of the leaving alarm in a case where the second operation information indicates that the second type of opening/closing unit is operated.

According to one or more embodiments of the invention, it is possible to prevent the operation of the alarm by detecting the location of the user is in the vicinity of the vehicle.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Embodiment 1

A vehicle alarm control device according to Embodiment 1 will be described with reference to FIGS. 1A to 3.

(Outline of Vehicle and the Like)

Figure 1A:
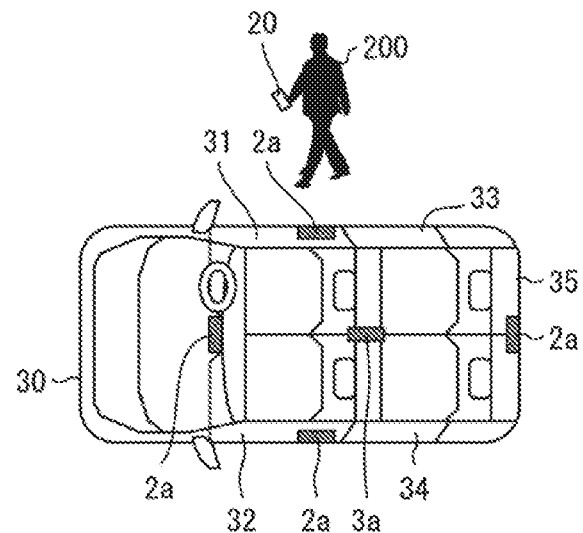
FIGS. 1A and 1B are views illustrating a vehicle on which a vehicle control system according to an embodiment of the invention is installed and a portable device.
Figure 1B:
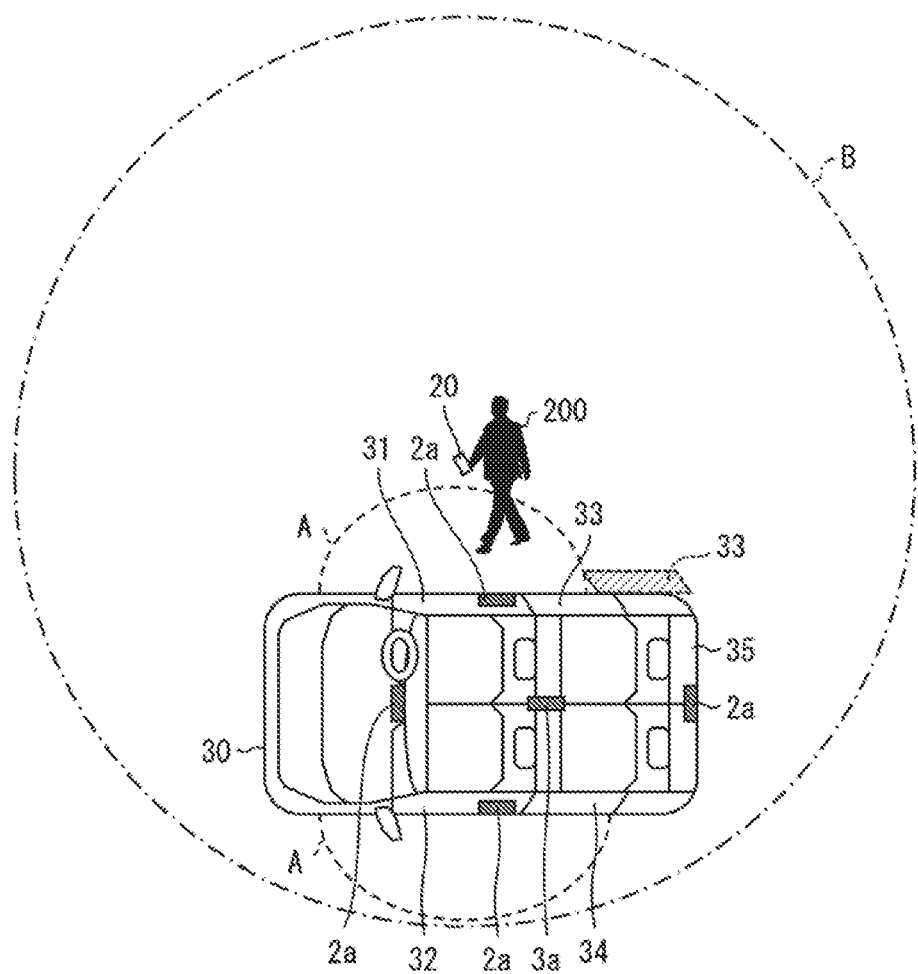

First, an outline of a vehicle 30 and the like will be described with reference to FIGS. 1A and 1B. FIGS. 1A and 1B are views illustrating the vehicle 30 on which a vehicle control system 100 is installed, and a portable device 20.

As illustrated in FIGS. 1A and 1B, the vehicle 30 includes a motorcycle. The vehicle 30 is provided with a plurality of doors 31 to 35. Among the doors, the door 31 of a driving seat of the vehicle 30, the door 32 of an assistant seat, the door 33 of a right rear seat, the door 34 of a left rear seat, and the back door 35 of a rear surface of the vehicle 30 can be automatically locked and unlocked by a door lock device 11 of FIG. 2.

Figure 2:
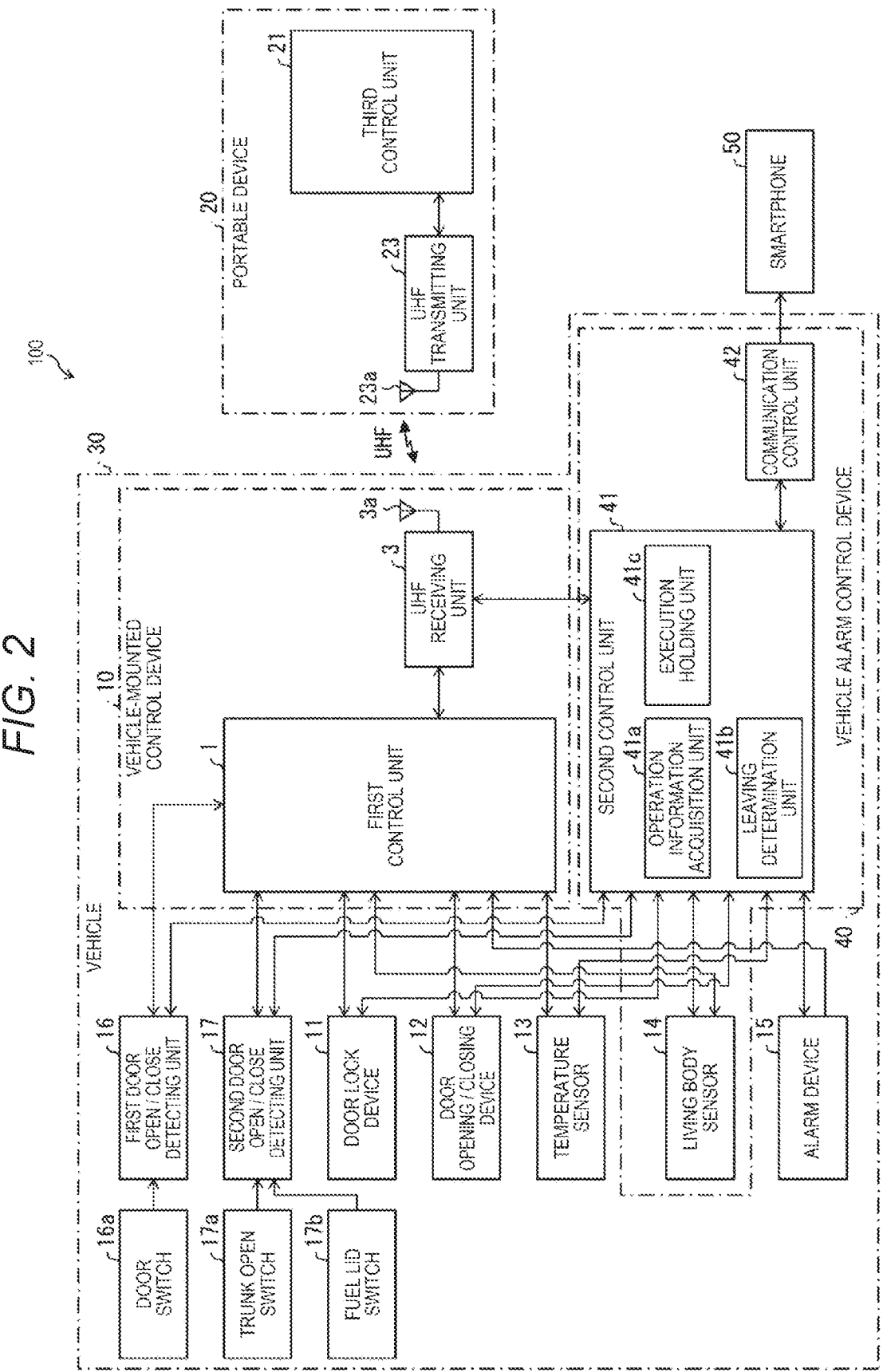
FIG. 2 is a configuration view of the vehicle control system according to a first embodiment of the invention.

The doors 33 and 34 of the left and right rear seats are power sliding doors which can be automatically opened and closed by the door opening/closing device 12 of FIG. 2 (refer to the door 33 indicated by a broken line in FIG. 1B). Hereinafter, the power sliding door is referred to as "PSD". The PSD 33 and the PSD 34 of the left and right rear seats may be doors of hinge mechanisms. In this case, the vehicle 30 does not need the door opening/closing device 12.

In the specification, the doors 31 to 34 are examples of "first type of opening/closing unit". The door 35 represents a trunk, and is an example of "second type of opening/closing unit". In the specification, the first type of opening/closing unit is an opening/closing unit related to getting-on/off of an occupant. In addition, in the specification, the second type of opening/closing unit means an opening/closing unit other than the first type of opening/closing unit. More specifically, it is preferable that the second type of opening/closing unit is an opening/closing unit other than the first type of opening/closing unit, and is a partition that spatially separates the outside of the vehicle from the inside of the vehicle. Examples of the second type of opening/closing unit can include windows (not illustrated) provided in the doors 31 to 34, a fuel lid (not illustrated), a charging port (not illustrated), and a bonnet (not illustrated), in addition to the above-described door 35.

A living body (not illustrated) is present in the vehicle interior of the vehicle 30. Examples of the living body can include infants, pets, and the elderly. The portable device 20 is carried by the user 200 of the vehicle 30. Examples of the user can include a guardian of an infant, a pet owner, and a caregiver of an elderly person. The portable device 20 is an example of an "apparatus that can be carried by a user".

(Configuration of Vehicle Control System)

Next, the configuration of the vehicle control system 100 will be described with reference to FIGS. 1A and 1B and FIG. 2. FIG. 2 is a configuration view of the vehicle control system 100 according to the embodiment.

As illustrated in FIG. 2, the vehicle control system 100 includes a vehicle-mounted control device 10, a portable device 20, and a vehicle alarm control device 40. In the vehicle control system 100, the operation of a vehicle-mounted device installed on the vehicle 30 is controlled based on the wireless communication performed by the vehicle-mounted control device 10 and the portable device 20, and the transmission and reception of various information performed by the vehicle-mounted control device 10 and the vehicle alarm control device 40. The vehicle alarm control device 40 is an example of the "vehicle control device" of one or more embodiments of the invention. The vehicle-mounted control device 10 and the vehicle alarm control device 40 may be separate bodies as in the embodiment, or the vehicle control device of one or more embodiments of the invention may be configured by integrating both devices.

The vehicle control system 100 (specifically, the vehicle alarm control device 40) performs wireless communication with a smartphone 50. The smartphone 50 is a multi-function mobile phone having functions of a personal computer, a personal digital assistant (PDA), and the like. The smartphone 50 displays various images that correspond to the received information on a display screen (not illustrated) by receiving various information from the vehicle alarm control device 40.

The vehicle control system 100 may perform wireless communication with a tablet terminal, a wristwatch-type wearable terminal, or the like. The configuration elements of the vehicle control system 100 may not include the smartphone 50. In other words, the vehicle control system 100 may include only the vehicle 30 and the portable device 20.

As illustrated in FIG. 2, the vehicle-mounted control device 10, the door lock device 11, the door opening/closing device 12, a temperature sensor 13, a living body sensor 14, an alarm device 15, a first door open/close detecting unit 16, a door switch 16a, a second door open/close detecting unit 17, a trunk open switch 17a, a fuel lid switch 17b, and the vehicle alarm control device 40 are installed on the vehicle 30.

<Vehicle-Mounted Control Device>

The vehicle-mounted control device 10 includes a first control unit 1 and an ultra high frequency (UHF) receiving unit 3. The first control unit 1 includes a CPU, a memory, and the like.

The UHF receiving unit 3 includes a UHF receiving antenna 3a, a reception signal processing unit (not illustrated), and the like. The UHF receiving unit 3 is installed, for example, in the vehicle interior of the vehicle 30. As illustrated in FIGS. 1A and 1B, the UHF receiving antenna 3a is installed on the ceiling of the vehicles 30.

The UHF receiving unit 3 receives the UHF signal (a signal of a UHF band) transmitted from the portable device 20 by the UHF receiving antenna 3a and the reception signal processing unit.

The first control unit 1 performs wireless communication with the portable device 20 via the LF transmitting unit 2 and the UHF receiving unit 3, and performs reception of the UHF signal and various information with respect to the portable device 20. In addition, the first control unit 1 collectively controls the door lock device 11, the door opening/closing device 12, the temperature sensor 13, the living body sensor 14, and the alarm device 15.

As illustrated in FIG. 2, the door lock device 11, the door opening/closing device 12, the temperature sensor 13, the living body sensor 14, and the alarm device 15 are respectively connected to the vehicle-mounted control device 10.

The door lock device 11 includes a mechanism for locking and unlocking the doors 31 to 35 of the vehicle 30, and a driving circuit for the mechanism. The door opening/closing device 12 includes a mechanism for opening and closing the PSD 33 and the PSD 34 of the vehicle 30, and driving circuits for the mechanism.

The door switch 16a illustrated in FIG. 2 includes door switches respectively installed in the doors 31 to 34 which are the first type of opening/closing units. As an example, in a case where the door 31 is in the open state, the door switch installed in the door 31 is in the ON state, and in a case where the door 31 is in the closed state, the door switch installed in the door 31 is in the OFF state. However, the example does not limit the embodiment, and a configuration in which the door switch is in the ON state in a case where the door is in the closed state, and the door switch is in the OFF state in a case where the door is in the open state may be employed. The same also applies to the other door switches included in the door switch 16a. The door switch 16a may also include a door switch provided in an opening/closing unit other than the doors 31 to 34 among the opening/closing units included in the first type of opening/closing unit.

The first door open/close detecting unit 16 detects the opening/closing operation of the first type of opening/closing unit by detecting the state of the door switch provided in the first type of opening/closing unit. In other words, the first door open/close detecting unit 16 detects the opening/closing operation of each of the plurality of opening/closing units included in the first type of opening/closing unit by detecting the state of the plurality of door switches included in the door switch 16a. For example, the first door open/close detecting unit 16 detects that the door 31 is opened in a case where the state of the door 31 has changed from the closed state to the open state, and detects that the door 31 is closed in a case where the state of the door 31 has changed from the open state to the closed state. The same applies to the other opening/closing units.

The trunk open switch 17a illustrated in FIG. 2 includes the door switch installed in the door 35 which is the second type of opening/closing unit. As an example, in a case where the door 35 is in the open state, the door switch installed in the door 35 is in the ON state, and in a case where the door 35 is in the closed state, the door switch installed in the door 35 is in the OFF state. However, the example does not limit the embodiment, and a configuration in which the door switch is in the ON state in a case where the door is in the closed state, and the door switch is in the OFF state in a case where the door is in the open state may be employed.

The fuel lid switch 17b illustrated in FIG. 2 includes a door switch installed in a fuel lid which is the second type of opening/closing unit. As an example, in a case where the fuel lid is in the open state, the door switch installed in the fuel lid is in the ON state, and in a case where the fuel lid is in the closed state, the door switch installed in the fuel lid is in the OFF state. However, the example does not limit the embodiment, and a configuration in which the door switch is in the ON state in a case where the fuel lid is in the closed state, and the door switch is in the OFF state in a case where the fuel lid is in the open state may be employed.

The second door open/close detecting unit 17 detects the opening % closing operation of the second type of opening/closing unit by detecting the state of the door switch provided in the second type of opening/closing unit. In other words, the second door open/close detecting unit 17 detects the opening/closing operation of each of the plurality of opening/closing units included in the second type of opening/closing unit by detecting the states of the plurality of door switches included in the trunk open switch 17a and the fuel lid switch 17b. For example, the second door open/close detecting unit 17 detects that the door 35 is opened in a case where the state of the door 35 has changed from the closed state to the open state, and detects that the door 35 is closed in a case where the state of the door 35 has changed from the open state to the closed state. The same applies to the other opening/closing units.

The vehicle 30 may have a configuration in which a switch (not illustrated) that can detect the open/close state of the windows, which are the second type of opening/closing units, provided in the doors 31 to 34; a switch (not illustrated) that can detect the open/close state of the charging port, which is the second type of opening/closing unit; and a Food switch (not illustrated) that can detect the open/close state of the bonnet, which is the second type of opening/closing unit, and the like are installed therein. The second door open/close detecting unit 17 may be configured to detect the opening/closing operation of each of the plurality of opening/closing units included in the second type of opening/closing unit by further detecting the states of the plurality of door switches included in the windows provided in the doors 31 to 34, the charging port, the bonnet, and the like.

The temperature sensor 13 is a sensor for detecting the temperature of the vehicle interior. The living body sensor 14 is a sensor for detecting bio-information of a living body in the vehicle interior, and is a configuration element of the vehicle alarm control device 40 which will be described later. The living body sensor 14 includes, for example, a radio wave sensor. The radio wave sensor detects bio-information by irradiating the living body with a radio wave and receiving a reflected wave from the living body. Examples of the bio-information include a heartbeat rate, a blood pressure, a respiration rate, a body temperature, a pulse rate, an electroencephalogram, and the like.

The alarm device 15 is a device for outputting sounds such as a buzzer or a horn.

<Portable Device>

The portable device 20 includes an electronic key. As illustrated in FIG. 2, the portable device 20 includes a third control unit 21 and a UHF transmitting unit 23. Each of the units 21 to 23 of the portable device 20 is operated by electric power of a battery (not illustrated) incorporated in the portable device 20. The third control unit 21 includes a CPU, a memory, and the like.

The LF receiving unit 22 includes an LF receiving antenna 22a, a reception signal processing unit (not illustrated), and the like. The LF receiving unit 22 receives the LF signal transmitted from the vehicle-mounted control device 10 by the LF receiving antenna 22a and the reception signal processing unit. The LF signal received by the LF receiving unit 22 includes a response request signal.

The UHF transmitting unit 23 includes a UHF transmitting antenna 23a, a transmission signal processing unit (not illustrated), and the like. The UHF transmitting unit 23 transmits the UHF signal generated by the transmission signal processing unit from the UHF transmitting antenna 23a to the vehicle-mounted control device 10. The UHF signal transmitted by the UHF transmitting unit 23 includes a response signal which will be described later.

The third control unit 21 performs wireless communication with the vehicle-mounted control device 10 via the LF receiving unit 22 and the UHF transmitting unit 23, and transmits and receives the LF signal, the UHF signal, and various information to and from the vehicle-mounted control device 10.

<Vehicle Alarm Control Device>

As illustrated in FIG. 2, the vehicle alarm control device 40 includes the living body sensor 14, a second control unit 41, and a communication control unit 42. The door lock device 11, the door opening/closing device 12, the temperature sensor 13, the alarm device 15, the first door open/close detecting unit 16, and the second door open/close detecting unit 17 are also respectively connected to the vehicle alarm control device 40.

The second control unit 41 includes a CPU, a memory, and the like. The second control unit 41 is connected to the first control unit 1, and transmits and receives various information to and from the vehicle-mounted control device 10, (specifically, the first control unit 1).

As illustrated in FIG. 2, the second control unit 41 includes an operation information acquisition unit 41a, a leaving determination unit 41b, and an execution holding unit 41c.

The operation information acquisition unit 41a acquires first operation information indicating whether or not the first type of opening/closing unit is operated from the first door open/close detecting unit 16. Here, the first operation information includes information indicating the opening/closing operation of each of the doors 31 to 34. The operation information acquisition unit 41a acquires the first operation information indicating that the first type of opening/closing unit is operated in a case where at least one of the doors 31 to 34 is operated, and acquires the first operation information indicating that the first type of opening/closing unit is not operated in other cases.

In addition, the operation information acquisition unit 41a acquires second operation information indicating whether or not the second type of opening/closing unit is operated from the second door open/close detecting unit 17. Here, the second operation information includes information indicating each of the opening and closing operations of the door 35, the fuel lid, the windows provided in the doors 31 to 34, the charging port, the bonnet, and the like. The operation information acquisition unit 41a acquires the second operation information indicating that the second type of opening/closing unit is operated in a case where at least one of the door 35, the fuel lid, the windows provided in the doors 31 to 34, the charging port, the bonnet, and the like is operated. In other cases, the operation information acquisition unit 41a acquires the second operation information indicating that the second type of opening/closing unit is not operated.

The leaving determination unit 41b determines whether or not the living body is left behind in the vehicle interior of the vehicle 30 with reference to the first operation information received from the operation information acquisition unit 41a and the bio-information received from the living body sensor 14. Specifically, in a case where the first operation information includes the information of the opening/closing operation of the first type of opening/closing unit, the leaving determination unit 41b receives the bio-information from the living body sensor 14, and determines whether or not the living body is left behind. In a case where it is determined that the living body is left behind and in a case where the first predetermined time has elapsed from the determination, the leaving determination unit 41b causes the alarm device 15 to execute a leaving alarm for notifying that the living body is left behind in the vehicle interior. Here, the first predetermined time is a time that serves as a reference when determining whether or not the user 200 came out of the vehicle for the purpose such as gasoline supply, and can be set to any time. As an example, the first predetermined time may be a time required for the user 200 to perform the operation of the second type of opening/closing unit after coming out of the vehicle, and one minute or the like can be exemplified as the first predetermined time. The determination method of leaving will be described later.

The execution holding unit 41c causes the alarm device 15 to hold execution of the leaving alarm with reference to the second operation information received from the operation information acquisition unit 41a. Specifically, in a case where the second operation information indicates that the second type of opening/closing unit is operated, and in a case where the second predetermined time has elapsed after the acquisition of the second operation information, the execution holding unit 41c causes the alarm device 15 to hold the execution of the leaving alarm. Here, the second predetermined time is a time that serves as a reference when determining whether or not the user who has completed the purpose such as the gasoline supply has returned to the vehicle interior, and can be set to any time. As an example, the second predetermined time may be a time required for the user 200 to return to the vehicle interior after performing the operation of the second type of opening/closing unit, and one minute or the like can be exemplified as the second predetermined time. In addition, the execution holding unit 41c may be configured to hold the execution of the leaving alarm in a case where the opening/closing operation information of any one of the above-described second type of opening/closing units is acquired, or may be configured to hold the execution of the leaving alarm in a case where the opening/closing operation information of at least two or more of the second type of opening/closing units is acquired.

In addition, even in a case where the second operation information includes the information of the opening and closing operation of the second type of opening/closing unit, and in a case where the environment in the vehicle interior of the vehicle 30 is a dangerous environment for the living body, the execution holding unit 41c cancels the holding of the execution of the leaving alarm.

As an example, the execution holding unit 41c determines whether or not the temperature in the vehicle interior of the vehicle 30 is a temperature dangerous to the living body. Specifically, the execution holding unit 41c determines whether or not the temperature in the vehicle interior, which is received from the temperature sensor 13, is equal to or higher than a first predetermined temperature or equal to or lower than a second predetermined temperature. Here, the second predetermined temperature is lower than the first predetermined temperature. When it is determined that the temperature in the vehicle interior is equal to or higher than the first predetermined temperature or equal to or lower than the second predetermined temperature, the execution holding unit 41c cancels the holding of the execution of the leaving alarm. The first predetermined temperature and the second predetermined temperature are reference temperatures that serves as a reference when determining whether or not the temperature in the vehicle interior is dangerous to the living body, and can be set to any temperature. Specifically, the first predetermined temperature may be a temperature that does not induce heat stroke, and 40° C. or the like can be exemplified as the first predetermined temperature. The second predetermined temperature may be a temperature that does not induce hypothermia, and 0° C. or the like can be exemplified as the second predetermined temperature. The first predetermined temperature and the second predetermined temperature are stored in, for example, a memory (not illustrated) of the second control unit 41.

As another example, the execution holding unit 41c determines whether or not the carbon monoxide concentration in the atmosphere in the vehicle interior of the vehicle 30 is dangerous to the living body. Specifically, the execution holding unit 41c determines whether or not the carbon monoxide concentration in the atmosphere in the vehicle interior, which is received from a gas sensor (not illustrated) installed in the vehicle interior, is equal to or higher than a predetermined threshold value. In a case where it is determined that the carbon monoxide concentration in the atmosphere in the vehicle interior is equal to or higher than a predetermined threshold value, the execution holding unit 41c cancels the holding of the execution of the leaving alarm. The predetermined threshold value is a threshold value that serves as a reference when determining whether or not the environment in the vehicle interior is dangerous to the living body, and can be set to any time. The predetermined threshold value is stored in, for example, the memory of the second control unit 41. In the above-described example, the determination on whether or not the carbon monoxide concentration in the atmosphere is dangerous to the living body is exemplified, but the execution holding unit 41c according to the embodiment may be configured to determine the carbon dioxide concentration in the atmosphere instead of the carbon monoxide concentration in the atmosphere.

The communication control unit 42 performs radio communication with, for example, a Wi-Fi (registered trademark) or the smartphone 50, and controls the transmission of various information from the vehicle alarm control device 40 to the smartphone 50. The communication control unit 42 and the smartphone 50 are wirelessly connected to each other by Wi-Fi, Bluetooth (registered trademark) or telematics.

The second control unit 41 controls the communication control unit 42 such that the smartphone 50 displays an alarm image on the display screen under the control of the communication control unit 42. By the alarm device 15 outputting the alarm sound and the smartphone 50 displaying the alarm image on the display screen, the user 200 can notice the fact that the living body is left behind and that the environment in the vehicle interior of the vehicle 30 is dangerous to the living body with a high probability.

(Leaving Determination Method)

An example of a leaving determination method (vehicle control method) in the embodiment will be described below.

Based on the bio-information received from the living body sensor 14, the leaving determination unit 41b starts detection of the presence of a living body (hereinafter, referred to as "target living body") which is a target in the vehicle interior. Specifically, the presence of the target living body in the vehicle interior is detected by comparing the reference bio-information that serves as a reference as to whether or not the target living body is present in the vehicle interior with the bio-information received from the living body sensor 14. As the reference bio-information, general bio-information of an infant or an elderly person can be exemplified. The reference bio-information is stored in, for example, the memory of the second control unit 41.

As a result of the comparison, in a case where the bio-information detected by the living body sensor 14 matches or approximates the reference bio-information, the leaving determination unit 41b detects that the target living body is present in the vehicle interior. In a case where it is detected that the target living body is present in the vehicle interior, the leaving determination unit 41b determines that the target living body is left behind.

Meanwhile, in a case where the living body sensor 14 has not generally detected the bio-information, or in a case where the bio-information detected by the living body sensor 14 is clearly different from the reference bio-information as a result of the comparison, the leaving determination unit 41b determines that the target living body is not present in the vehicle interior. In a case where it is detected that the target living body is not present in the vehicle interior, the leaving determination unit 41b determines that the target living body is not left behind.

(Operations of Vehicle-Mounted Control Device, Portable Device, and Vehicle Alarm Control Device)

Figure 3:
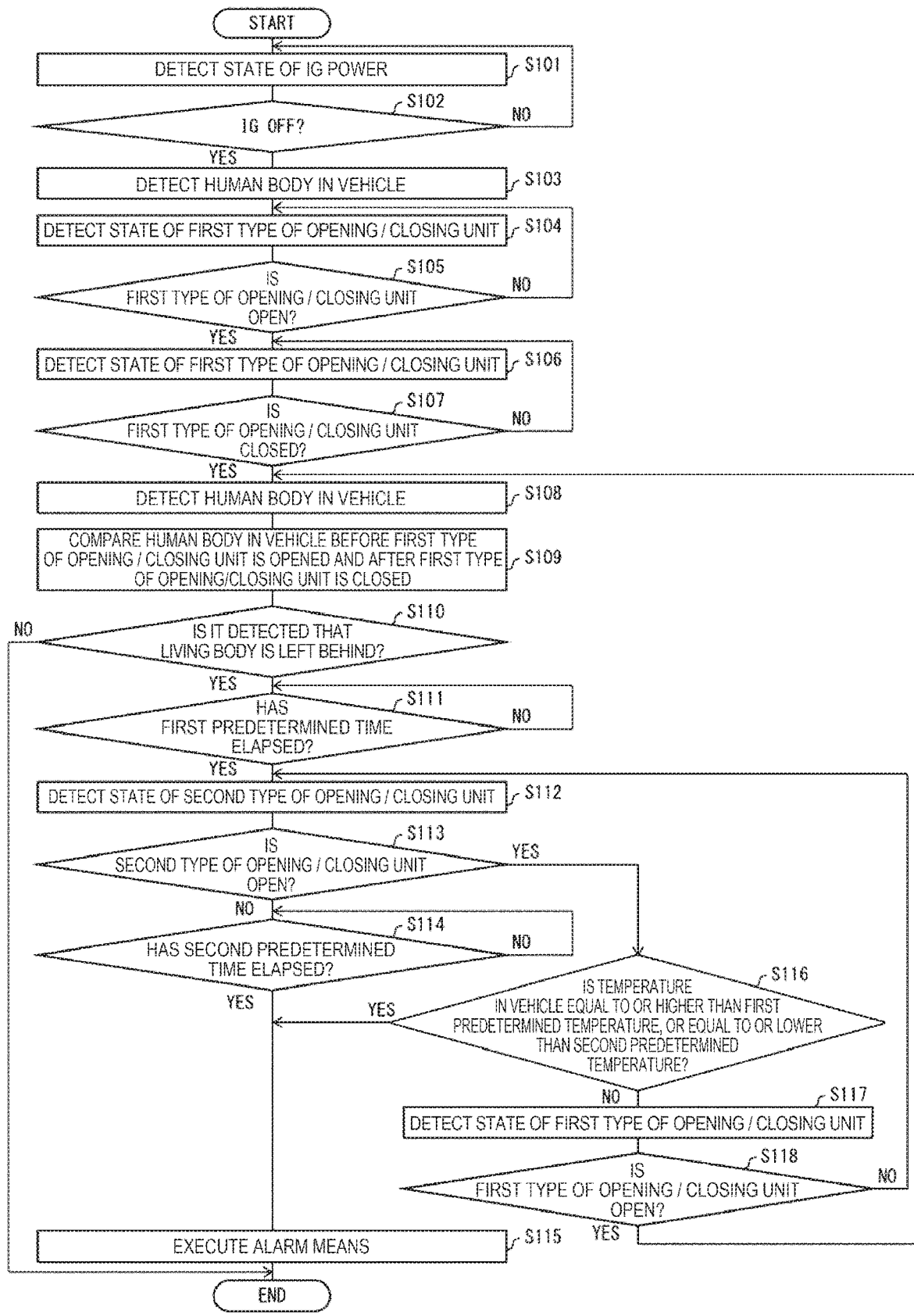
FIG. 3 is a flowchart illustrating an example of the operation of the vehicle alarm control device according to the first embodiment of the invention.

Next, the operations of the vehicle-mounted control device 10 and the vehicle alarm control device 40 will be described with reference to FIG. 3. FIG. 3 is a flowchart illustrating the operation of the vehicle-mounted control device 10 and the vehicle alarm control device 40.

The second control unit 41 starts detecting the state of an IG power (not illustrated) from the time point when the vehicle 30 stops (step S101 in FIG. 3).

In a case where it is detected that the state of the IG power is ON (step S102 in FIG. 3: NO), the second control unit 41 again detects the state of the IG power.

In a case where it is detected that the IG power is OFF (step S102 in FIG. 3: YES), the second control unit 41 causes the leaving determination unit 41b to start detecting the human body in the vehicle interior of the vehicle 30 (step S103 in FIG. 3). Specifically, the leaving determination unit 41b acquires the bio-information of the living body in the vehicle interior of the vehicle 30 from the living body sensor 14. The leaving determination unit 41b stores the bio-information acquired from the living body sensor 14 in, for example, the memory of the second control unit 41.

Next, the second control unit 41 causes the operation information acquisition unit 41a to acquire the detection result of the open/close state of the first type of opening/closing unit from the first door open/close detecting unit 16 (step S104 in FIG. 3).

In a case where the detection result acquired from the first door open/close detecting unit 16 indicates that the first type of opening/closing unit is in the closed state (step S105 in FIG. 3: NO), the operation information acquisition unit 41a returns to step S104 and again acquires the detection result of the open/close state of the first type of opening/closing unit from the first door open/close detecting unit 16.

In a case where the detection result acquired from the first door open/close detecting unit 16 indicates that the first type of opening/closing unit is in the open state (step S105 in FIG. 3: YES), regarding whether or not the state of the first type of opening/closing unit has changed, the operation information acquisition unit 41a acquires the detection result of the open/close state of the first type of opening/closing unit from the first door open/close detecting unit 16 (step S106 in FIG. 3).

In a case where the detection result acquired from the first door open/close detecting unit 16 indicates that the first type of opening/closing unit is in the open state (step S107 in FIG. 3: NO), the operation information acquisition unit 41a returns to step S106 and acquires the detection result of the open/close state of the first type of opening/closing unit from the first door open/close detecting unit 16.

In a case where the detection result acquired from the first door open/close detecting unit 16 indicates that the first type of opening/closing unit is in the closed state (step S107 in FIG. 3: YES), the operation information acquisition unit 41a causes the leaving determination unit 41b to start detecting the human body in the vehicle interior of the vehicle 30 (step S108 in FIG. 3). Specifically, the leaving determination unit 41b acquires the bio-information of the living body in the vehicle interior of the vehicle 30 from the living body sensor 14. The leaving determination unit 41b stores the bio-information acquired from the living body sensor 14 in, for example, the memory of the second control unit 41.

The leaving determination unit 41b compares the bio-information stored in the memory of the second control unit 41 in step S103 (before the first type of opening/closing unit is opened) with the bio-information stored in the memory of the second control unit 41 in step S108 (after the first type of opening/closing unit is closed) (step S109 in FIG. 3). The leaving determination unit 41b determines that the living body is left behind in the vehicle interior of the vehicle 30 based on the result of comparing the bio-information in step S109 (step S110 of FIG. 3).

In a case where it is determined that the living body is not left behind (NO in step S110 of FIG. 3), the leaving determination unit 41b ends the leaving determination processing.

In a case where it is determined that the living body is left behind (step S110 in FIG. 3: YES), the leaving determination unit 41b determines whether or not the first predetermined time has elapsed after it is determined that the living body is left behind (step S111 in FIG. 3).

In a case where it is determined that the first predetermined time has not elapsed after it is determined that the living body is left behind (step S111 in FIG. 3: NO), the leaving determination unit 41b returns to step S111 and determines whether or not the first predetermined time has elapsed after it is determined again that the living body is left behind. Here, the first predetermined time is a time required for determining whether or not the living body is out of the vehicle for the purpose such as gasoline supply.

In a case where it is determined that the first predetermined time has elapsed after it is determined that the living body is left behind (step S111 in FIG. 3: YES), the leaving determination unit 41b causes the operation information acquisition unit 41a to acquire the detection result of the open/close state of the second type of opening/closing unit indicating whether or not the second type of opening/closing unit is operated from the second door open/close detecting unit 17 (step S112 in FIG. 3).

In a case where the detection result acquired by the operation information acquisition unit 41a indicates that the second type of opening/closing unit is in the closed state, that is, in a case where the detection result does not indicate that the second type of opening/closing unit is operated (step S113 in FIG. 3: NO), the leaving determination unit 41b determines whether or not the second predetermined time has elapsed after the detection result is acquired (step S114 in FIG. 3).

In a case where it is determined that the second predetermined time has not elapsed after the detection result is acquired (step S114 in FIG. 3: NO), the leaving determination unit 41b determines whether or not the second predetermined time has elapsed after the detection result is acquired. Here, the second predetermined time is a time set as a time required for the user 200 to return to the vehicle interior after completing the purpose such as gasoline supply.

In a case where it is determined that the second predetermined time has elapsed after the detection result is acquired (step S114 in FIG. 3: YES), the leaving determination unit 41b causes the alarm device 15 to output an alarm sound (step S115 in FIG. 3).

In a case where the detection result acquired by the operation information acquisition unit 41a indicates that the second type of opening/closing unit is in the open state, that is, in a case where the detection result indicates that the second type of opening/closing unit is operated (step S113 in FIG. 3: YES), the leaving determination unit 41b causes the execution holding unit 41c to hold the execution of the alarm sound with respect to the alarm device 15. Then, the temperature inside the vehicle interior of the vehicle 30 is acquired. Specifically, the execution holding unit 41c acquires the detection result of the temperature in the vehicle interior of the vehicle 30 from the temperature sensor 13.

Next, the execution holding unit 41c compares the temperature acquired from the temperature sensor 13 with the first predetermined temperature and the second predetermined temperature stored in the memory of the second control unit 41. In a case where the temperature acquired from the temperature sensor 13 is equal to or higher than the first predetermined temperature or equal to or lower than the second predetermined temperature (step S116 in FIG. 3: YES), the execution holding unit 41c cancels the holding of the execution of the alarm sound for the alarm device 15, and causes the alarm device 15 to output the alarm sound (step S115 in FIG. 3).

In a case where the temperature acquired from the temperature sensor 13 is lower than the first predetermined temperature and higher than the second predetermined temperature (step S116 in FIG. 3: NO), the execution holding unit 41c causes the operation information acquisition unit 41a to acquire the detection result of the open/close states of the first type of opening/closing units from the first door open/close detecting unit 16 (step S117 in FIG. 3).

In a case where the detection result acquired from the first door open/close detecting unit 16 indicates that the first type of opening/closing unit is in the closed state (step S118 in FIG. 3: NO), the operation information acquisition unit 41a returns to step S112 and acquires again the detection result of the open/close state of the second type of opening/closing unit from the second door open/close detecting unit 17.

In a case where the detection result acquired from the first door open/close detecting unit 16 indicates that the first type of opening/closing is in the open state (step S118:YES in FIG. 3), the operation information acquisition unit 41a returns to the step S108, and regarding whether or not the state of the living body in the vehicle interior of the vehicle 30 has changed, the leaving determination unit 41b acquires the bio-information of the living body in the vehicle interior of the vehicle 30 from the living body sensor 14.

In this manner, the execution holding unit 41c can hold the execution of the leaving alarm in a case where the user 200 came out of the vehicle interior for the purpose such as gasoline supply, battery charging of the EV vehicle, oil replacement, and the like without the canceling operation of the alarm device by determining the open/close state of the second type of opening/closing unit.

Embodiment 2

A vehicle alarm control device according to Embodiment 2 will be described with reference to FIGS. 4 and 5.

Figure 4:
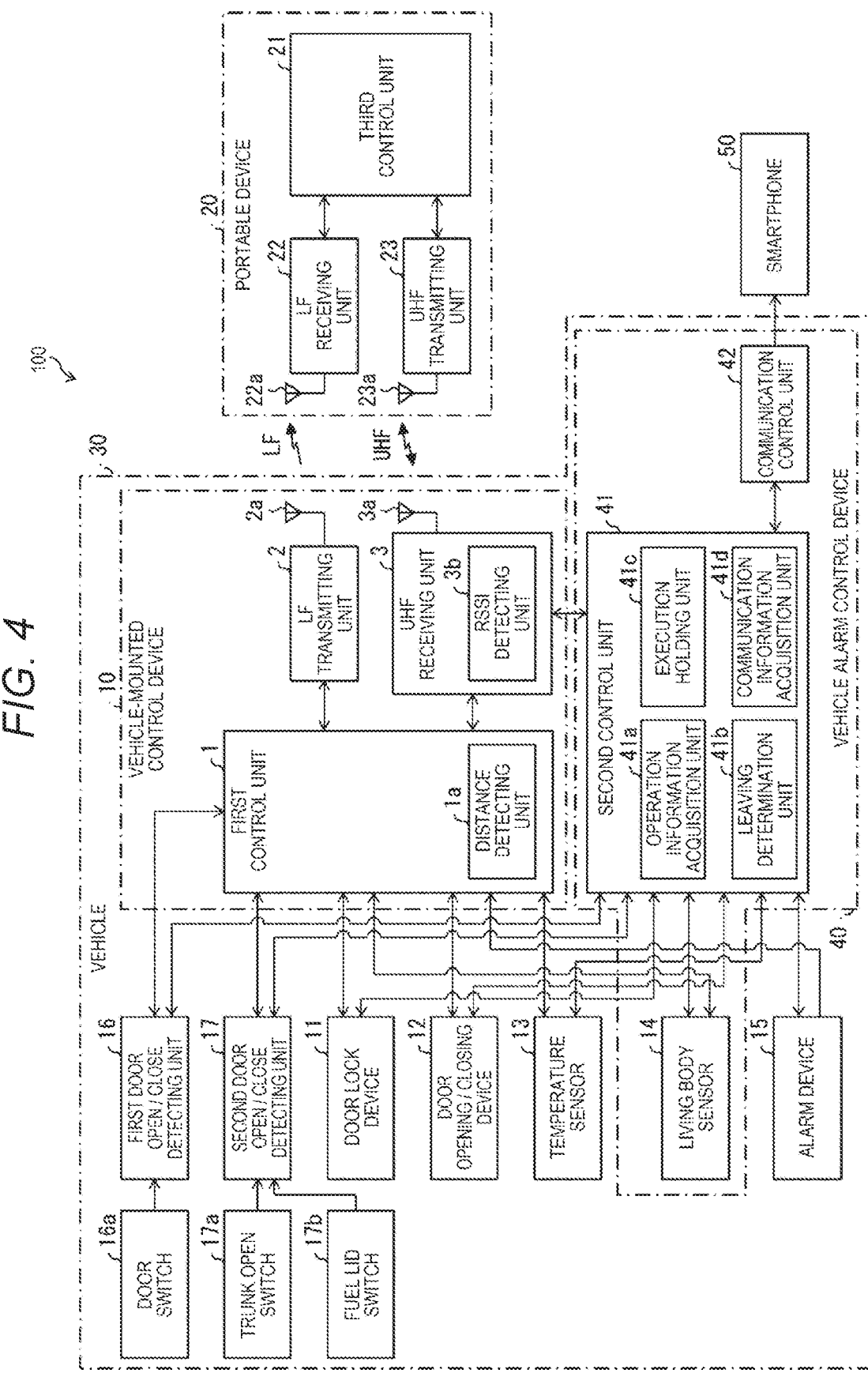
FIG. 4 is a configuration view of a vehicle control system according to a second embodiment of the invention.

FIG. 4 is a configuration view of a vehicle control system according to the embodiment. The vehicle control system according to the embodiment further includes an LF transmitting unit 2 in the vehicle-mounted control device 10 of the vehicle control system 100 according to Embodiment 1, further includes a distance detecting unit 1a in the first control unit 1, further includes a RSSI detecting unit 3b in the UHF receiving unit 3, further includes a communication information acquisition unit 41d in the second control unit 41, and further includes the LF receiving unit 22 in the portable device 20. In the following description, the same members as those already described will be given the same reference numerals, and the description thereof will be omitted.

A plurality of LF transmitting units 2 are installed in the vehicle 30 (only one of the units will be collectively illustrated in FIG. 2). Each of the LF transmitting units 2 includes LF transmitting antennas 2a, transmission signal processing units (not illustrated), and the like. As illustrated in FIGS. 1A and 1B, the LF transmitting antennas 2a are installed on the right side surface, the left side surface, the rear surface, the vehicle interior, and the like of the vehicle 30.

The LF transmitting unit 2 transmits an LF signal (a signal of an LF band) generated by the transmission signal processing unit to the portable device 20 outside the vehicle or inside the vehicle from the LF transmitting antennas 2a. The LF signal transmitted by the LF transmitting unit 2 includes a response request signal for requesting a response to the portable device 20.

The RSSI detecting unit 3b of the UHF receiving unit 3 detects RSSI values (reception intensity) of the UHF signal (response signal) received by the UHF receiving antenna 3a and the reception signal processing unit. The distance detecting unit 1a of the first control unit 1 detects the distance from the vehicle 30 to the portable device 20 based on the RSSI values detected by the RSSI detecting unit 3b.

The first control unit 1 performs wireless communication with the portable device 20 via the LF transmitting unit 2 and the UHF receiving unit 3, and transmits and receives the LF signal, the UHF signal, and various information to and from the portable device 20.

In FIG. 1B, a vehicle exterior LF communication range A surrounded by a broken line is a reachable range of the LF signals transmitted from the LF transmitting antennas 2a respectively provided on the left and right side surfaces and the rear surface of the vehicle 30 to the outside of the vehicle. In FIG. 1B, for convenience, a part of a broken line of the vehicle exterior LF communication range A will be omitted. As illustrated in FIG. 1B, when the portable device 20 enters the vehicle exterior LF communication range A, the LF signal transmitted from the vehicle-mounted control device 10 can be received by the portable device 20. Incidentally, a reachable range (not illustrated) of the LF signals transmitted from the LF transmitting antennas 2a provided in the vehicle interior of the vehicle 30 substantially extends to the inside of the vehicle 30.

In FIG. 1B, a UHF communication range B surrounded by the one-dot chain line is a reachable range of the UHF signal transmitted from the UHF transmitting antenna 23a provided in the portable device 20. In FIG. 1B, a part of the one-dot chain line of the UHF communication range B will be omitted for convenience. As illustrated in FIG. 1B, when the UHF receiving antennas 3a enter the UHF communication range B, the vehicle-mounted control device 10 can receive the UHF signals transmitted from the portable device 20.

As illustrated in FIG. 1B, the UHF communication range B is wider than the vehicle exterior LF communication range A. In other words, a reaching distance of the UHF signal is longer than a reaching distance of the LF signal.

The communication information acquisition unit 41d acquires communication information indicating a communication state with the portable device 20. Specifically, the communication information acquisition unit 41d acquires the RSSI values detected by the RSSI detecting unit 3b, from the RSSI detecting unit 3b. The communication information acquisition unit 41d transmits the acquired RSSI values to the execution holding unit 41c.

The execution holding unit 41c detects location information of the portable device 20 with reference to the RSSI values received from the communication information acquisition unit 41d, and determines whether or not the portable device 20 is present within a predetermined range from the vehicle 30. In a case where it is determined that the portable device 20 is present within a predetermined range from the vehicle 30, the execution holding unit 41c causes the alarm device 15 to hold the execution of the leaving alarm.

In this manner, the execution holding unit 41c according to the embodiment causes the alarm device 15 to hold the execution of the leaving alarm with reference to at least one of the second operation information received from the operation information acquisition unit 41a and the detected location information of the portable device 20. The determination method of the location of the portable device 20 will be described later.

(Determination Method of Location of Portable Device 20)

The determination method of the location of the portable device 20 will be described below.

First, the LF transmitting unit of the vehicle-mounted control device 10 transmits the LF signals via the LF transmitting antennas 2a. The LF signal transmitted by the LF transmitting unit 2 includes a response request signal for requesting a response to the portable device 20.

Next, the LF receiving unit 22 of the portable device 20 receives the LF signal via the LF receiving antenna 22a. Then, the third control unit 21 of the portable device 20 transmits the UHF signal including the response signal and the ID code from the UHF transmitting unit 23 to the vehicle-mounted control device 10 via the UHF transmitting antenna 23a. At this time, the RSSI values of the LF signal received by the LF receiving unit 22 are added to the UHF signal transmitted from the UHF transmitting unit 23.

In the vehicle-mounted control device 10, the UHF receiving unit 3 receives the UHF signals via the UHF receiving antennas 3a. Then, the RSSI detecting unit 3b of the UHF receiving unit 3 detects the RSSI values of the received UHF signals and transmits the detected values to the communication information acquisition unit 41d.

Next, the communication information acquisition unit 41d detects the distance from the vehicles 30 to the portable devices 20 based on the RSSI values received from the RSSI detecting unit 3b. The communication information acquisition unit 41d determines the location of the user 200 by comparing the detected distance from the vehicle 30 to the portable device 20 with the reference distance. The reference distance is a distance that serves as a reference when determining whether or not the user 200 came out of the vehicle, that is, a distance that serves as a reference when determining whether or not the user 200 is present within a predetermined range from the vehicle 30. The reference distance can be exemplified by a linear distance perpendicular to the traveling direction of the vehicle 30 from the side end portion of the driving seat in the vehicle interior to the door opening portion on the side of the driving seat. The reference distance is stored in, for example, the memory of the second control unit 41.

(Operations of Vehicle-Mounted Control Device, Portable Device, and Vehicle Alarm Control Device)

Next, the operations of the vehicle-mounted control device 10, the portable device 20, and the vehicle alarm control device 40 according to the embodiment will be described with reference to FIG. 5. FIG. 5 is a flowchart illustrating the operations of the vehicle-mounted control device 10, the portable device 20, and the vehicle alarm control device 40.

Figure 5:
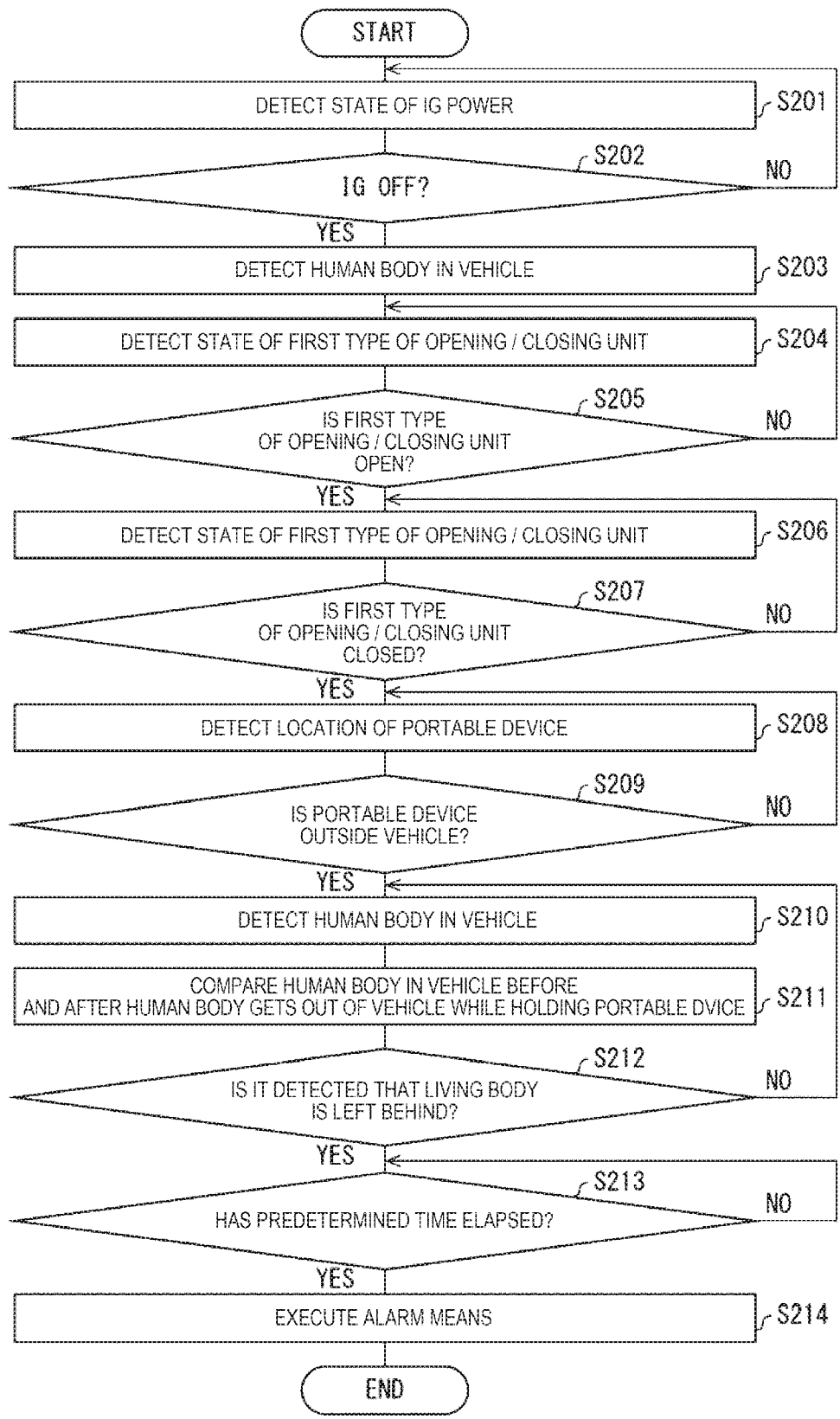
FIG. 5 is a flowchart illustrating an example of an operation of a vehicle alarm control device according to the second embodiment of the invention.

The second control unit 41 starts detecting the state of the IG power (not illustrated) from the time point when the vehicle 30 stops (step S201 in FIG. 5).

In a case where it is detected that the state of the IG power is ON (step S202 in FIG. 5: NO), the second control unit 41 again detects the state of the IG power.

In a case where it is detected that the IG power is OFF (step S202 in FIG. 5: YES), the second control unit 41 causes the leaving determination unit 41*b* to start detecting the human body in the vehicle interior of the vehicle 30 (step S203 in FIG. 5). Specifically, the leaving determination unit 41*b* acquires the bio-information of the living body in the vehicle interior of the vehicle 30 from the living body sensor 14. The leaving determination unit 41*b* stores the bio-information acquired from the living body sensor 14 in, for example, the memory of the second control unit 41.

Next, the second control unit 41 causes the operation information acquisition unit 41*a* to acquire the detection result of the open/close state of the first type of opening/closing unit from the first door open/close detecting unit 16 (step S204 in FIG. 5).

In a case where the detection result acquired from the first door open/close detecting unit 16 indicates that the first type of opening/closing unit is in the closed state (step S205 in FIG. 5: NO), the operation information acquisition unit 41*a* returns to step S204 and acquires again the detection result of the open/close state of the first type of opening/closing unit from the first door open/close detecting unit 16.

In a case where the detection result acquired from the first door open/close detecting unit 16 indicates that the first type of opening/closing unit is in the open state (step S205 in FIG. 5: YES), regarding whether or not the state of the first type of opening/closing unit has changed, the operation information acquisition unit 41*a* acquires the detection result of the open/close state of the first type of opening/closing unit from the first door open/close detecting unit 16 (step S206 in FIG. 5).

In a case where the detection result acquired from the first door open/close detecting unit 16 indicates that the first type of opening/closing unit is in the open state (step S207 in FIG. 5: NO), the operation information acquisition unit 41*a* returns to step S206 and acquires again the detection result of the open/close state of the first type of opening/closing unit from the first door open/close detecting unit 16.

In a case where the detection result acquired from the first door open/close detecting unit 16 indicates that the first type of opening/closing unit is in the closed state (step S207 in FIG. 5: YES), the operation information acquisition unit 41*a* causes the execution holding unit 41*c* to start detecting the location of the portable device 20 (step S208 in FIG. 5). Specifically, the execution holding unit 41*c* receives the RSSI values acquired by the communication information acquisition unit 41*d* from the RSSI detecting unit 3*b*. The execution holding unit 41*c* detects the distance from the vehicle 30 to the portable device 20 with reference to the received RSSI values. The execution holding unit 41*c* determines whether or not the portable device 20 is in the vehicle interior of the vehicle 30 by comparing the detected distance with the reference distance (step S209 in FIG. 5). In addition, the determination on whether or not the portable device 20 is in the vehicle interior of the vehicle 30 may be expressed as the determination on whether or not the portable device 20 is within a predetermined range from the vehicle 30.

In a case where it is determined that the portable device 20 is in the vehicle interior of the vehicle 30 (step S209 in FIG. 5: NO), the execution holding unit 41*c* returns to the step S208 and again starts detecting the portable device 20.

In a case where it is determined that the portable device 20 is outside the vehicle 30 (step S209 in FIG. 5: YES), the execution holding unit 41*c* causes the leaving determination unit 41*b* to start detecting the human body in the vehicle interior of the vehicle 30 (step S210 in FIG. 5). Specifically, the leaving determination unit 41*b* acquires the bio-information of the living body in the vehicle interior of the vehicle 30 from the living body sensor 14. The leaving determination unit 41*b* stores the bio-information acquired from the living body sensor 14 in, for example, the memory of the second control unit 41.

The leaving determination unit 41*b* compares the bio-information stored in the memory of the second control unit 41 in step S203 (before the first type of opening/closing unit is opened) with the bio-information stored in the memory of the second control unit 41 in step S210 (after the first type of opening-closing unit is closed) (step S211 in FIG. 5). The leaving determination unit 41*b* determines that the living body is left behind in the vehicle interior of the vehicle 30 based on the result of comparing the bio-information in step S211 (step S212 of FIG. 5).

In a case where it is determined that the living body is not left behind (step S212 in FIG. 5: NO), the leaving determination unit 41*b* returns to the step S210, and regarding whether or not the state of the living body in the vehicle interior of the vehicle 30 has changed, the bio-information of the living body in the vehicle interior of the vehicle 30 is acquired from the living body sensor 14.

In a case where it is determined that the living body is left behind (step S212 in FIG. 5: YES), the leaving determination unit 41*b* determines whether or not the predetermined time has elapsed after it is determined that the living body is left behind (step S213 in FIG. 5).

In a case where it is determined that the predetermined time has not elapsed after it is determined that the living body is left behind (step S213 in FIG. 5: NO), the leaving determination unit 41*b* returns to step S213 and determines whether or not the first predetermined time has elapsed after it is determined again that the living body is left behind.

In a case where it is determined that a predetermined time has elapsed after it is determined that the living body is left behind (step S213 in FIG. 5: YES), the leaving determination unit 41*b* causes the alarm device 15 to output an alarm sound (step S214 in FIG. 5). Here, the predetermined time is a time that is set to any time. As an example, the predetermined time may be set to a short time such as 10 seconds. In addition, a configuration may be employed in which the step S213 of determining the predetermined time is omitted and the step S214 of outputting the alarm sound to the alarm device 15 is performed.

In the embodiment, a configuration has been described in which the execution of the leaving alarm in the alarm device 15 is held by determining the location of the portable device 20, but the embodiment is not limited thereto. For example, a configuration may be adopted in which, in addition to the determination of the location of the portable device 20, the execution of the leaving alarm in the alarm device 15 is held with reference to the operation information of the second type of opening/closing unit.

In this configuration, in a case where the leaving determination unit 41b detects that the living body is left behind, and in a case where it is detected that the operation information acquisition unit 41a detects that the second type of opening/closing unit is not operated, the leaving determination unit 41b may determine that the living body is left behind (step S212 in FIG. 5: YES).

In this manner, by determining the location of the portable device 20, in a case where the user 200 is present within a predetermined range from the vehicle 30, the execution holding unit 41c can hold the execution of the alarm without the canceling operation of the alarm device.

Embodiment 3

A vehicle alarm control device according to Embodiment 3 will be described with reference to FIG. 6.

The vehicle control system according to the embodiment has the same configuration as that of the vehicle control system according to Embodiment 2. The embodiment illustrates a flow of the leaving detection alarm different from that of Embodiment 2. Hereinafter, only a configuration for performing an operation different from that of the vehicle alarm control device according to Embodiment 2 will be described, and the description of other configurations will be omitted.

(Determination Method of Location of Portable Device 20)

The determination method of the location of the portable device 20 will be described below.

First, the LF transmitting unit of the vehicle-mounted control device 10 transmits the LF signals via the LF transmitting antennas 2a. The LF signal transmitted by the LF transmitting unit 2 includes a response request signal for requesting a response to the portable device 20.

Next, the LF receiving unit 22 of the portable device 20 receives the LF signal via the LF receiving antenna 22a. Then, the third control unit 21 of the portable device 20 transmits the UHF signal including the response signal and the ID code from the UHF transmitting unit 23 to the vehicle-mounted control device 10 via the UHF transmitting antenna 23a. At this time, the RSSI values of the LF signal received by the LF receiving unit 22 are added to the UHF signal transmitted from the UHF transmitting unit 23.

In the vehicle-mounted control device 10, the UHF receiving unit 3 receives the UHF signals via the UHF receiving antennas 3a. Then, the RSSI detecting unit 3b of the UHF receiving unit 3 detects the RSSI values of the received UHF signals and transmits the detected values to the communication information acquisition unit 41d.

Next, the communication information acquisition unit 41d detects the distance from the vehicles 30 to the portable devices 20 based on the RSSI values received from the RSSI detecting unit 3b. The communication information acquisition unit 41d determines the location of the user 200 by comparing the detected distance from the vehicle 30 to the portable device 20 with the reference distance. The reference distance is a distance that serves as a reference when determining whether or not the user 200 is present within a predetermined range from the vehicle 30. As illustrated in FIG. 1B, the reference distance may be any distance as long as the portable device 20 is present in the vehicle exterior LF communication range A and the UHF receiving antenna 3a of the vehicle-mounted control device 10 is present in the UHF communication range B, and can be set to any distance by the user 200. The reference distance is stored in, for example, the memory of the second control unit 41.

(Operations of Vehicle-Mounted Control Device, Portable Device, and Vehicle Alarm Control Device)

Next, the operations of the vehicle-mounted control device 10, the portable device 20, and the vehicle alarm control device 40 according to the embodiment will be described with reference to FIG. 6. FIG. 6 is a flowchart illustrating the operations of the vehicle-mounted control device 10, the portable device 20, and the vehicle alarm control device 40. In the embodiment, it is assumed that the user 200 who holds the portable device 20 came out of the vehicle 30 during the process from step S303 to step S307.

Figure 6:
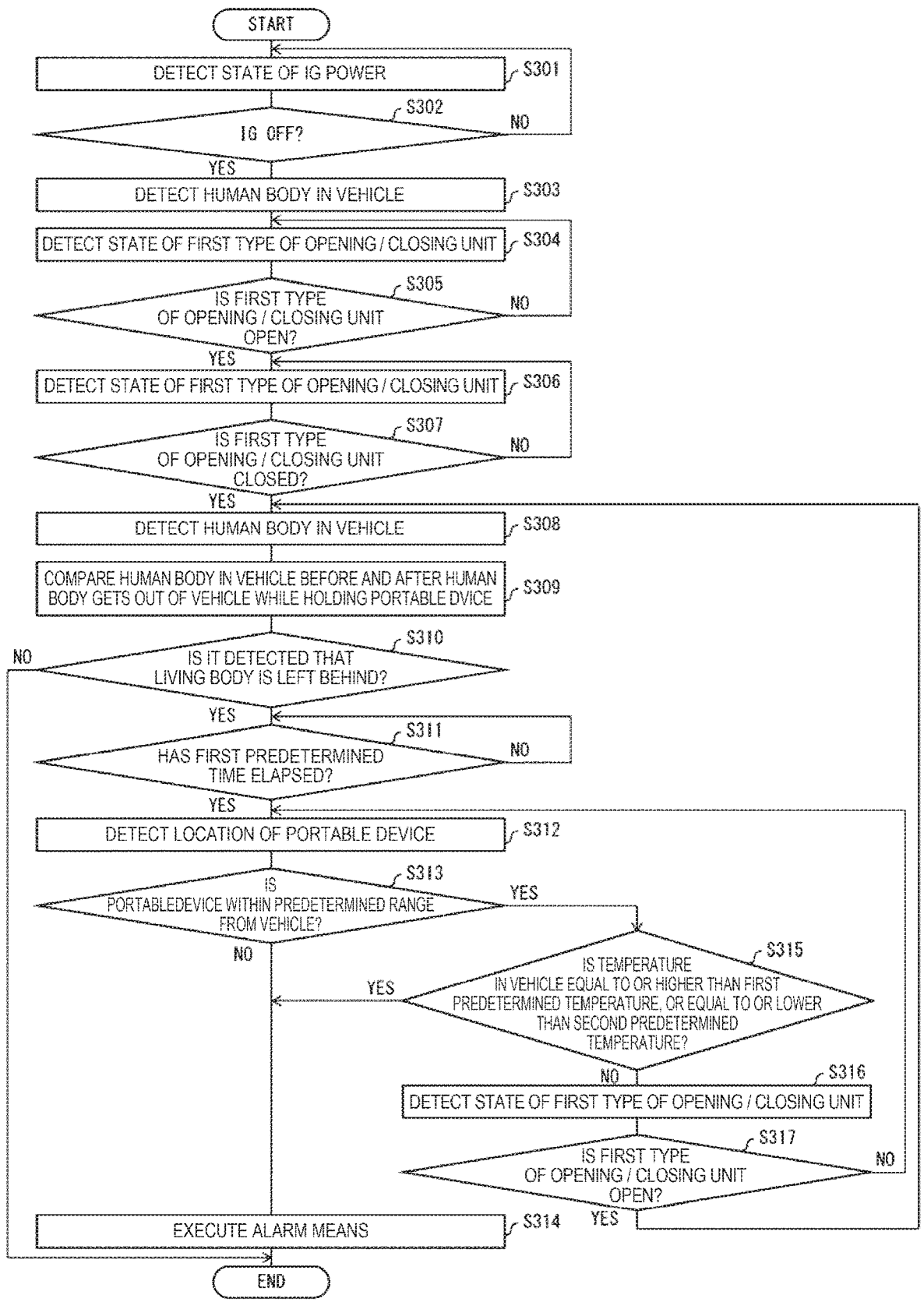
FIG. 6 is a flowchart illustrating an example of the operation of the vehicle alarm control device according to the second embodiment of the invention.

The second control unit 41 starts detecting the state of the IG power (not illustrated) from the time point when the vehicle 30 stops (step S301 in FIG. 6).

In a case where it is detected that the state of the IG power is ON (step S302 in FIG. 6: NO), the second control unit 41 again detects the state of the IG power.

In a case where it is detected that the IG power is in the OFF state (step S302 in FIG. 6: YES), the second control unit 41 causes the leaving determination unit 41b to start detecting the human body in the vehicle interior of the vehicle 30 (step S303 in FIG. 6). Specifically, the leaving determination unit 41b acquires the bio-information of the living body in the vehicle interior of the vehicle 30 from the living body sensor 14. The leaving determination unit 41b stores the bio-information acquired from the living body sensor 14 in, for example, the memory of the second control unit 41.

Next, the second control unit 41 causes the operation information acquisition unit 41a to acquire the detection result of the open/close state of the first type of opening/closing unit from the first door open/close detecting unit 16 (step S304 in FIG. 6).

In a case where the detection result acquired from the first door open/close detecting unit 16 indicates that the first type of opening/closing unit is in the closed state (step S305 in FIG. 6: NO), the operation information acquisition unit 41a returns to step S304 and acquires again the detection result of the open/close state of the first type of opening/closing unit from the first door open/close detecting unit 16.

In a case where the detection result acquired from the first door open/close detecting unit 16 indicates that the first type of opening/closing unit is in the open state (step S305 in FIG. 6: YES), regarding whether or not the state of the first type of opening/closing unit has changed, the operation information acquisition unit 41a acquires the detection result of the open/close state of the first type of opening/closing unit from the first door open/close detecting unit 16 (step S306 in FIG. 6).

In a case where the detection result acquired from the first door open/close detecting unit 16 indicates that the first type of opening/closing unit is in the open state (step S307 in FIG. 6: NO), the operation information acquisition unit 41a returns to step S306 and acquires again the detection result of the open/close state of the first type of opening/closing unit from the first door open/close detecting unit 16.

In a case where the detection result acquired from the first door open/close detecting unit 16 indicates that the first type of opening/closing unit is in the closed state (step S307 in FIG. 6: YES), the operation information acquisition unit 41a causes the leaving determination unit 41b to start detecting the human body in the vehicle interior of the vehicle 30 (step S308 in FIG. 6). Specifically, the leaving determination unit 41*b* acquires the bio-information of the living body in the vehicle interior of the vehicle 30 from the living body sensor 14. The leaving determination unit 41*b* stores the bio-information acquired from the living body sensor 14 in, for example, the memory of the second control unit 41.

The leaving determination unit 41*b* compares the bio-information stored in the memory of the second control unit 41 in step S303 (before the first type of opening/closing unit is opened) with the bio-information stored in the memory of the second control unit 41 in step S308 (after the first type of opening/closing unit is closed) (step S309 in FIG. 6). The leaving determination unit 41*b* determines that the living body is left behind in the vehicle interior of the vehicle 30 based on the result of comparing the bio-information in step S309 (step S310 of FIG. 6).

In a case where it is determined that the living body is not left behind (NO in step S310 of FIG. 6), the leaving determination unit 41*b* ends the leaving determination processing.

In a case where it is determined that the living body is left behind (step S310 in FIG. 6: YES), the leaving determination unit 41*b* determines whether or not the first predetermined time has elapsed after it is determined that the living body is left behind (step S311 in FIG. 6).

In a case where it is determined that the first predetermined time has not elapsed after it is determined that the living body is left behind (step S311 in FIG. 6: NO), the leaving determination unit 41*b* returns to step S111 and determines whether or not the first predetermined time has elapsed after it is determined again that the living body is left behind.

In a case where it is determined that the first predetermined time has elapsed after it is determined that the living body is left behind (step S311 in FIG. 6: YES), the leaving determination unit 41*b* causes the execution holding unit 41*c* to start detecting the location of the portable device 20 (step S312 in FIG. 6). Specifically, the execution holding unit 41*c* receives the RSSI values acquired by the communication information acquisition unit 41*d* from the RSSI detecting unit 3*b*. The execution holding unit 41*c* detects the distance from the vehicle 30 to the portable device 20 with reference to the received RSSI values. The execution holding unit 41*c* determines whether or not the portable device 20 is in the predetermined range from the vehicle 30 by comparing the detected distance with the reference distance (step S313 in FIG. 6). Here, the first predetermined time is a time required for determining whether or not the portable device is out of the vehicle for the purpose such as chat, and is a time set to any time. As an example, the first predetermined time may be set to a short time such as 10 seconds. In addition, a configuration may be adopted in which the step S311 of determining the first predetermined period is omitted and the step S312 of detecting the location of the portable device 20 is performed.

In a case where it is determined that the portable device 20 is not within a predetermined range from the vehicle 30 (step S313 in FIG. 6: NO), the execution holding unit 41*c* causes the alarm device 15 to output an alarm sound (step S314 in FIG. 6).

In a case where it is determined that the portable device 20 is within a predetermined range from the vehicle 30 (step S313 in FIG. 6: YES), the execution holding unit 41*c* causes the alarm device 15 to hold the execution of the alarm sound, and causes the execution holding unit 41*c* to acquire the temperature of the vehicle interior of the vehicle 30. Specifically, the execution holding unit 41*c* acquires the detection result of the temperature in the vehicle interior of the vehicle 30 from the temperature sensor 13.

Next, the execution holding unit 41*c* compares the temperature acquired from the temperature sensor 13 with the first predetermined temperature and the second predetermined temperature stored in the memory of the second control unit 41. In a case where the temperature acquired from the temperature sensor 13 is equal to or higher than the first predetermined temperature or equal to or lower than the second predetermined temperature (step S315 in FIG. 6: YES), the execution holding unit 41*c* cancels the holding of the execution of the alarm sound for the alarm device 15, and outputs the alarm sound to the alarm device 15 (step S314 in FIG. 6).

In a case where the temperature acquired from the temperature sensor 13 is lower than the first predetermined temperature and higher than the second predetermined temperature (step S315 in FIG. 6: NO), the execution holding unit 41*c* causes the operation information acquisition unit 41*a* to acquire the detection result of the open/close states of the first type of opening/closing units from the first door open/close detecting unit 16 (step S316 in FIG. 6).

In a case where the detection result acquired from the first door open/close detecting unit 16 indicates that the first type of opening/closing unit is in the closed state (step S317 in FIG. 6: NO), the operation information acquisition unit 41*a* returns to step S312 and again causes the execution holding unit 41*c* to start detecting the location of the portable device 20.

In a case where the detection result acquired from the first door open/close detecting unit 16 indicates that the first type of opening/closing unit is in the open state (step S317:YES in FIG. 6), the operation information acquisition unit 41*a* returns to the step S308, and regarding whether or not the state of the living body in the vehicle interior of the vehicle 30 has changed, the leaving determination unit 41*b* acquires the bio-information of the living body in the vehicle interior of the vehicle 30 from the living body sensor 14.

In the embodiment, a configuration has been described in which the execution of the leaving alarm in the alarm device 15 is held by determining the location of the portable device 20, but the embodiment is not limited thereto. For example, a configuration may be adopted in which, in addition to the determination of the location of the portable device 20, the execution of the leaving alarm in the alarm device 15 is held with reference to the operation information of the second type of opening/closing unit.

In this configuration, in a case where the leaving determination unit 41*b* detects that the living body is left behind, and in a case where it is detected that the operation information acquisition unit 41*a* detects that the second type of opening/closing unit is not operated, the leaving determination unit 41*b* may determine that the living body is left behind (step S310 in FIG. 5: YES).

In this manner, the execution holding unit 41*c* can hold the execution of the alarm in a case where the user 200 came out the vehicle for the purpose such as gasoline supply, battery charging of the EV vehicle, oil replacement, and the like without the canceling operation of the alarm device by determining the location of the portable device 20.

(Implementation Example by Software)

The control blocks of the vehicle-mounted control device 10 and the vehicle alarm control device 40 (in particular, the distance detecting unit 1*a*, the operation information acquisition unit 41*a*, the leaving determination unit 41*b*, the execution holding unit 41*c*, and the communication information acquisition unit 41*d*) may be realized by a logical circuit (hardware) formed on an integrated circuit (IC-chip) or the like, or may be realized by software.

In the latter case, the vehicle-mounted control device 10 and the vehicle alarm control device 40 include a computer which executes commands of a program which is software for realizing each function. The computer includes, for example, one or more processors and a computer-readable recording medium in which the program is stored. In the computer, the object of one or more embodiments of the invention is achieved by reading and executing the program from the recording medium by the processor.

The processor may be, for example, a central processing unit (CPU). As the recording medium, tapes, disks, cards, semiconductor memories, programmable logic circuits, and the like can be used in addition to a "non-transitory tangible medium", for example, a read only memory (ROM) and the like.

In addition, a random access memory (RAM) or the like for expanding the programs may further be provided. In addition, the program may be supplied to the computer via any transmission medium (communication network or a broadcast wave) capable of transmitting the program. In addition, one aspect of the invention can also be realized in the form of a data signal embedded in a carrier wave in which the program is embodied by electronic transmission.

(Summary)

There is provided the vehicle control device (vehicle alarm control device 40) according to Aspect 1 of the invention is a vehicle control device (vehicle alarm control device 40) for determining whether or not the living body is left behind in the vehicle, the vehicle control device including: the operation information acquisition unit (41*a*) that acquires first operation information indicating whether or not a first type of opening/closing unit (31 to 34) is operated and second operation information indicating whether or not a second type of opening/closing unit is operated, the first type of opening/closing unit (31 to 34) being an opening/closing unit related to getting-on/off of the occupant and included in the opening/closing units of the vehicle (30), the second type of opening/closing unit being an opening/closing unit other than the first type of opening/closing unit (31 to 34) and included in the opening/closing unit of the vehicle (30); the leaving determination unit (41*b*) that determines whether or not the living body is left behind with reference to the first operation information, and determines execution of the leaving alarm in a case where it is determined that the living body is left behind; and the execution holding unit (41*c*) that holds the execution of the leaving alarm by the leaving determination unit (41*b*) in a case where the second operation information indicates that the second type of opening/closing unit is operated.

According to the above-described configuration, by determining the open/close state of the second type of opening/closing unit, the execution holding unit can hold the execution of the alarm in a case where the user came out of the vehicle for the purpose without the canceling operation of the alarm device.

In the vehicle control device (vehicle alarm control device 40) according to Aspect 2 of the invention, in the Aspect 1, the second type of opening/closing unit may include at least one of a fuel lid and a charging port. According to the above-described configuration, even in a case where the user came out of the vehicle for the purpose such as gasoline supply, battery charging of the EV vehicle, or the like, the execution of the alarm can be held without the canceling operation of the alarm device.

In the vehicle control device (vehicle alarm control device 40) according to Aspect 3 of the invention, in the Aspect 1 or 2, the second type of opening/closing unit may include at least one of a bonnet and a trunk. According to the above-described configuration, even in a case where the user came out of the vehicle for the purpose such as oil replacement, baggage loading/unloading, or the like, the execution of the alarm can be held without the canceling operation of the alarm device.

In the vehicle control device (vehicle alarm control device 40) according to Aspect 4 of the invention, in any one of the Aspects 1 to 3, the execution holding unit (41*c*) may cancel the holding of the execution of the leaving alarm in a case where a temperature in the vehicle (30) is equal to or higher than a first predetermined temperature or equal to or lower than a second predetermined temperature even in a case where the second operation information indicates that the second type of opening/closing unit is operated.

According to the above-described configuration, by determining whether or not the environment in the vehicle interior is dangerous to the living body, the execution holding unit increases the number of elements for determining when executing the alarm. Therefore, even in a case where the user came out of the vehicle interior for the above-described purpose, it is possible to notify that the living body is left behind in the vehicle interior with high accuracy.

According to Aspect 5 of the invention, there is provided the vehicle control method for determining whether or not the living body is left behind in the vehicle (30), the vehicle control method including: acquiring first operation information indicating whether or not a first type of opening/closing unit (31 to 34) is operated and second operation information indicating whether or not a second type of opening/closing unit is operated, the first type of opening/closing unit (31 to 34) being an opening/closing unit related to getting-on/off of the occupant included in the opening/closing units of the vehicle (30), the second type of opening/closing unit being an opening/closing unit other than the first type of opening/closing unit (31 to 34) and included in the opening/closing units of the vehicle (30); determining whether or not the living body is left behind with reference to the first operation information, and determining execution of the leaving alarm in a case where it is determined that the living body is left behind; and holding the execution of the leaving alarm in a case where the second operation information indicates that the second type of opening/closing unit is operated. According to the above-described configuration, the same effect as that of the vehicle control device according to Aspect 1 of the invention is obtained.

In addition, the vehicle control device (vehicle alarm control device 40) according to Aspects 1 to 5 of the invention may be realized by a computer, and a program for causing the computer to function as each of the above-described units is also included in the scope of the invention.

(Additional Notes)

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A vehicle control device for determining whether or not a living body is left behind in a vehicle, the vehicle control device comprising:

an operation information acquisition unit that acquires first operation information indicating whether or not a first type of opening/closing unit is operated and second operation information indicating whether or not a second type of opening/closing unit is operated, the first type of opening/closing unit being an opening/closing unit related to getting-on/off of an occupant and included in opening/closing units of the vehicle, the second type of opening/closing unit being an opening/closing unit other than the first type of opening/closing unit and included in the opening/closing units of the vehicle;

a leaving determination unit that determines whether or not the living body is left behind with reference to the first operation information, and determines execution of a leaving alarm in a case where it is determined that the living body is left behind; and an execution holding unit that holds the execution of the leaving alarm by the leaving determination unit in a case where the second operation information indicates that the second type of opening/closing unit is operated.

2. The vehicle control device according to claim 1, wherein the second type of opening/closing unit comprises at least one of a fuel lid and a charging port.

3. The vehicle control device according to claim 1, wherein the second type of opening/closing unit comprises at least one of a bonnet and a trunk.

4. The vehicle control device according to claim 1, wherein the execution holding unit cancels the holding of the execution of the leaving alarm in a case where a temperature in the vehicle is equal to or higher than a first predetermined temperature or equal to or lower than a second predetermined temperature even in a case where the second operation information indicates that the second type of opening/closing unit is operated.

5. A vehicle control method for determining whether or not a living body is left behind in a vehicle, the vehicle control method comprising:

acquiring first operation information indicating whether or not a first type of opening/closing unit is operated and second operation information indicating whether or not a second type of opening/closing unit is operated, the first type of opening/closing unit being an opening/closing unit related to getting-on/off of an occupant and included in opening/closing units of the vehicle, the second type of opening/closing unit being an opening/closing unit other than the first type of opening/closing unit and included in the opening/closing units of the vehicle;

determining whether or not the living body is left behind with reference to the first operation information, and determining execution of a leaving alarm in a case where it is determined that the living body is left behind; and holding the execution of the leaving alarm in a case where the second operation information indicates that the second type of opening/closing unit is operated.

* * * * *